(12) United States Patent
Hsu et al.

(10) Patent No.: US 8,670,905 B2
(45) Date of Patent: Mar. 11, 2014

(54) VEHICLE STABILITY CONTROL METHOD AND SYSTEM

(75) Inventors: Jin-Yan Hsu, Lugong (TW); Bo-Ruei Chen, Lugong (TW); Tsung-Hsien Hu, Lugong (TW)

(73) Assignee: Automotive Research & Testing Center, Lugong (TW)

( * ) Notice: Subject to any disclaimer, the term of this patent is extended or adjusted under 35 U.S.C. 154(b) by 0 days.

(21) Appl. No.: 13/333,532

(22) Filed: Dec. 21, 2011

(65) Prior Publication Data

US 2013/0103263 A1     Apr. 25, 2013

(30) Foreign Application Priority Data

Oct. 21, 2011   (TW) .............................. 100138289 A

(51) Int. Cl.
*B62D 6/00*     (2006.01)
*B62D 7/15*     (2006.01)
*B60G 17/016*   (2006.01)

(52) U.S. Cl.
CPC .................................. *B60G 17/016* (2013.01)
USPC ........ 701/42; 701/1; 701/41; 701/48; 701/70; 280/5.51

(58) Field of Classification Search
CPC ... B60T 2210/22; B60T 8/1755; B60T 8/243; B60T 8/17554; B60T 8/17552; B60T 8/18; B60T 8/17555; B60T 8/175; B60T 8/885; B60T 8/171; B62D 7/159; B62D 5/0463; B62D 5/008; B62D 6/003; B62D 6/002

USPC ............ 701/1, 36, 37, 48, 41, 70; 280/124.1, 280/5.503, 5.504, 5.507, 5.508; 318/14, 318/368, 432, 587; 180/41, 417
See application file for complete search history.

(56) References Cited

U.S. PATENT DOCUMENTS

| | | | |
|---|---|---|---|
| 6,415,215 B1* | 7/2002 | Nishizaki et al. | 701/70 |
| 2004/0019417 A1* | 1/2004 | Yasui et al. | 701/36 |
| 2008/0172153 A1* | 7/2008 | Ozaki et al. | 701/36 |
| 2009/0306861 A1* | 12/2009 | Schumann et al. | 701/48 |
| 2011/0218706 A1* | 9/2011 | Mori et al. | 701/36 |

* cited by examiner

*Primary Examiner* — Tuan C. To
*Assistant Examiner* — Jelani Smith
(74) *Attorney, Agent, or Firm* — Stroock & Stroock & Lavan LLP

(57) ABSTRACT

A vehicle stability control method is to be performed by a vehicle stability control system of a motor vehicle, and includes the steps of: detecting an actual yaw rate, and obtaining a plurality of detection values by detecting a vehicle speed and a steering wheel angle, and at least one operation status selected from a lateral acceleration status, a load status and a steering wheel angular speed status; obtaining a plurality of intermediate weight values, from which a steering characteristic value is determined, based on the obtained detection values; obtaining a target yaw rate based on the vehicle speed, the steering wheel angle and the steering characteristic value; and controlling steering of road wheels according to difference between the target and actual yaw rates.

12 Claims, 3 Drawing Sheets

VEHICLE STABILITY CONTROL METHOD AND SYSTEM

BACKGROUND OF THE INVENTION

1. Field of the Invention

The present invention relates to a control method and system, more particularly to a vehicle stability control method and system.

2. Description of the Related Art

Traffic accidents have been a main cause of various losses. To improve road safety, much effort has been put into developing safer, smarter motor vehicles for ensuring safer driving experiences.

The electronic stability control (ESC) system of modern motor vehicles is generally programmed to actively intervene to provide corrective drive control actions upon detecting a probable loss of control. When cornering, sideslip and yawing may occur if the motor vehicle has a high center of mass or is travelling at a high speed, where a large sideslip angle indicates that the motor vehicle is slipping, a large yaw rate indicates that the motor vehicle is overturning, and a small yaw rate indicates that the motor vehicle is underturning. In such circumstances, the ESC system will compare a detected current travel trace of the motor vehicle and the driver's intention, and will automatically adjust braking torque (i.e., braking intervention) and steering angle of the road wheels (i.e., steering intervention) based on a result of the comparison in an attempt to prevent an occurrence of vehicle control loss.

U.S. Pat. No. 7,143,864 discloses a concept of road wheel steering angle control with reference to a target yaw rate calculated from a detected steering wheel angle. U.S. Pat. No. 7,191,048 discloses a concept of assistive braking intervention in accordance with a detected lateral acceleration status. U.S. Pat. No. 7,584,042 discloses a concept of steering and/or braking intervention based on a compensation value obtained through performing an integration operation upon a difference between a detected yaw rate and a target yaw rate.

Nevertheless, such methods of motor vehicle stability control suffer from the drawbacks of slower response times and speed reductions due to slower hydraulic pressure buildup processes attributed to the methods of braking intervention. Furthermore, since front-wheel driven motor vehicles have center-of-gravity configurations (and hence wheel turning characteristics) different from those of rear-wheel driven motor vehicles, the aforesaid concepts of motor vehicle stability control, which rely on measurement parameters such as steering angle, vehicle speed, and vehicle load, may not be universally applied across various types of motor vehicles, especially across front-wheel driven motor vehicles and rear-wheel driven motor vehicles due to their vastly different load ratio configurations. Thus, the aforesaid methods of motor vehicle stability control have low accuracies and provide poor vehicle stabilizing effects. In addition, a yaw rate calculated based solely on a relationship between a steering wheel angle and a vehicle speed may not satisfy practical needs.

SUMMARY OF THE INVENTION

Therefore, an object of the present invention is to provide a vehicle stability control method capable of alleviating the aforesaid drawbacks of the prior art.

Accordingly, a vehicle stability control method of the present invention is to be performed by a vehicle stability control system of a motor vehicle, and includes the steps of:

a) detecting an actual yaw rate of the motor vehicle, and obtaining a plurality of detection values by detecting a vehicle speed of the motor vehicle, a steering wheel angle of the motor vehicle, and at least one operation status selected from a lateral acceleration status, a load status and a steering wheel angular speed status of the motor vehicle;

b) obtaining a plurality of intermediate weight values, from which a steering characteristic value is determined, based on the detection values obtained in step a);

c) obtaining a target yaw rate based on the vehicle speed, the steering wheel angle and the steering characteristic value; and d) controlling steering of road wheels of the motor vehicle according to difference between the target yaw rate obtained in step c) and the actual yaw rate detected in step a).

According to another aspect, a vehicle stability control method of the present invention is to be performed by a vehicle stability control system of a motor vehicle, and includes the steps of:

a) obtaining a plurality of detection values by detecting a vehicle speed of the motor vehicle, a steering wheel angle of the motor vehicle, and at least one operation status selected from a lateral acceleration status, a load status and a steering wheel angular speed status of the motor vehicle;

b) obtaining a plurality of intermediate weight values, from which a steering characteristic value is determined, based on the detection values obtained in step a);

c) obtaining a target yaw rate and a maximum tolerable yaw rate based on the vehicle speed, the steering wheel angle and the steering characteristic value; and d) controlling steering of road wheels of the motor vehicle according to the target yaw rate if the target yaw rate is not greater than the maximum tolerable yaw rate and according to the maximum tolerable yaw rate if the target yaw rate is greater than the maximum tolerable yaw rate.

Another object of the present invention is to provide a vehicle stability control system that is capable of alleviating the aforesaid drawbacks of the prior art.

Accordingly, a vehicle stability control system of the present invention is for a motor vehicle and includes:

a detecting module configured to detect an actual yaw rate of the motor vehicle, and to obtain a plurality of detection values by detecting a vehicle speed of the motor vehicle, a steering wheel angle of the motor vehicle, and at least one operation status selected from a lateral acceleration status, a load status and a steering wheel angular speed status of the motor vehicle;

a processing module operatively associated with the detecting module, and configured to obtain a plurality of intermediate weight values, from which a steering characteristic value is determined, based on the detection values obtained by the detecting module, and to obtain a target yaw rate based on the vehicle speed, the steering wheel angle and the steering characteristic value; and a control module operatively associated with the processing module, and configured to control steering of road wheels of the motor vehicle according to difference between the target yaw rate obtained by the processing module and the actual yaw rate detected by the detecting module.

According to another aspect, a vehicle stability control system of the present invention is for a motor vehicle and includes:

a detecting module configured to obtain a plurality of detection values by detecting a vehicle speed of the motor vehicle, a steering wheel angle of the motor vehicle, and at least one operation status selected from a lateral acceleration status, a load status and a steering wheel angular speed status of the motor vehicle;

a processing module operatively associated with the detecting module, and configured to obtain a plurality of intermediate weight values, from which a steering characteristic value is determined, based on the detection values obtained by the detecting module, and to obtain a target yaw rate and a maximum tolerable yaw rate based on the vehicle speed, the steering wheel angle and the steering characteristic value; and a control module operatively associated with the processing module, and configured to control steering of road wheels of the motor vehicle according to the target yaw rate if the target yaw rate is not greater than the maximum tolerable yaw rate and according to the maximum tolerable yaw rate if the target yaw rate is greater than the maximum tolerable yaw rate.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
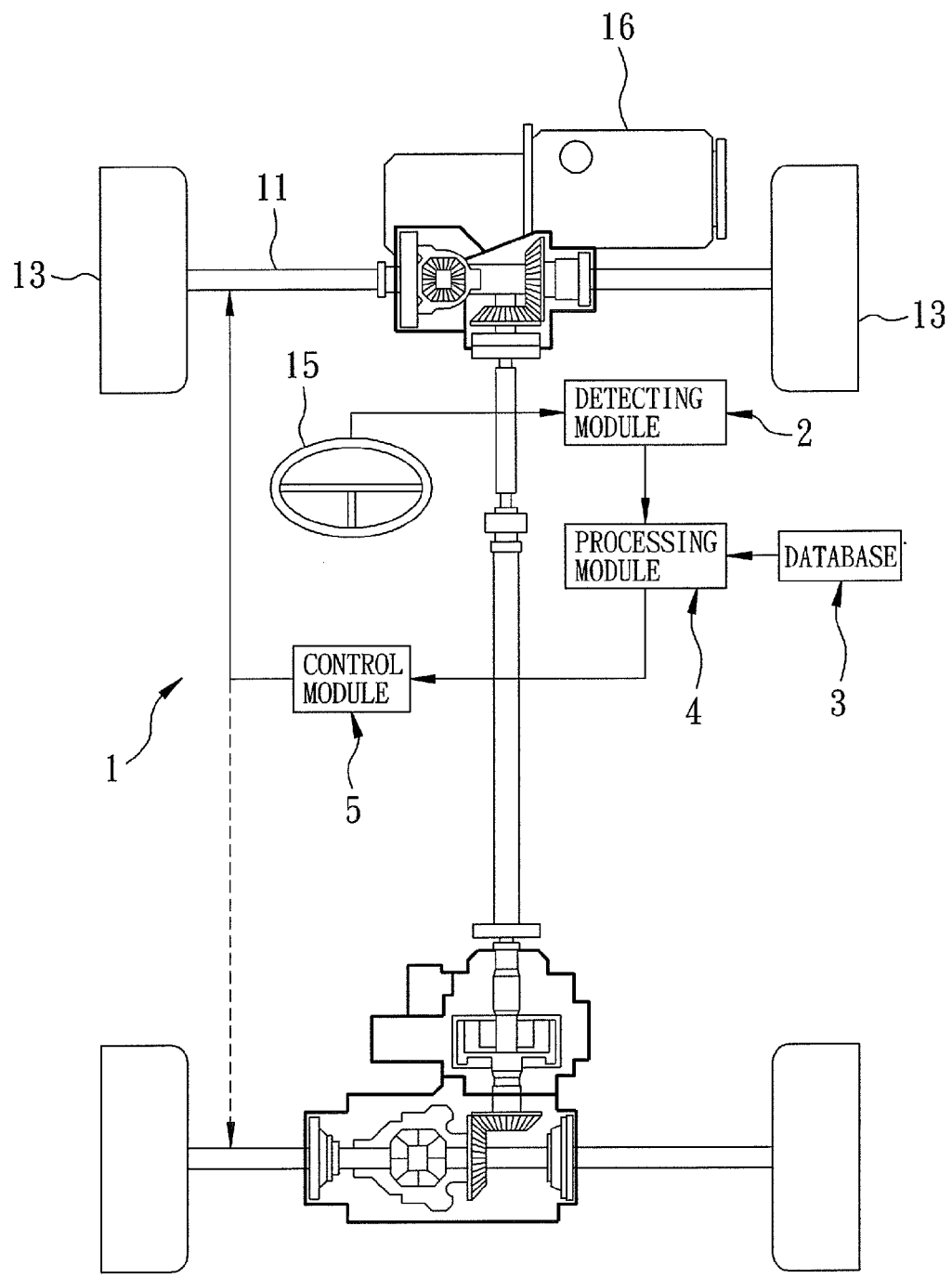
FIG. 1 is a schematic diagram to illustrate an exemplary configuration of the preferred embodiment of a vehicle stability control system in a motor vehicle according to the present invention.
Figure 2:
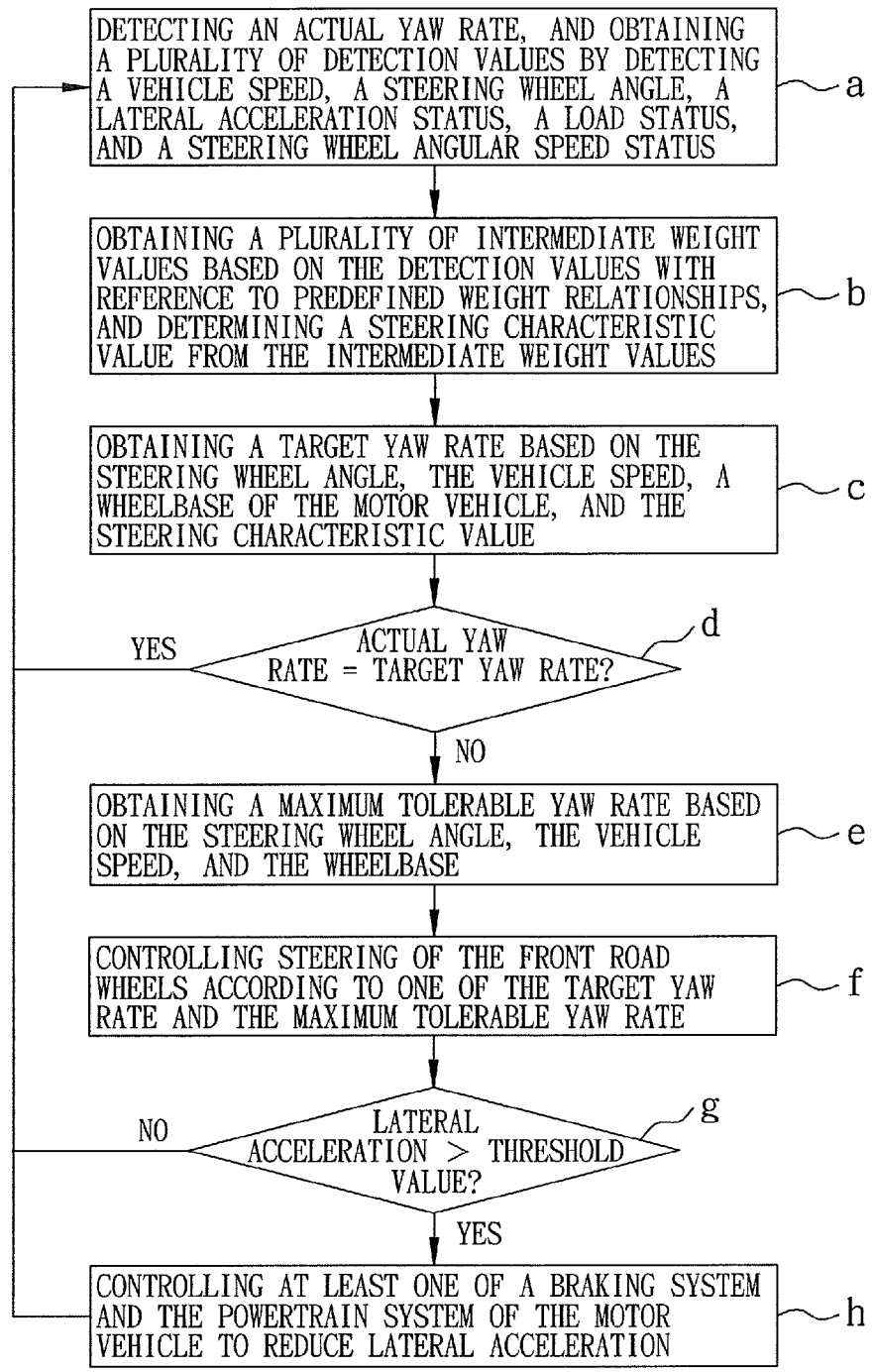
FIG. 2 is a flowchart to illustrate steps of the preferred embodiment of a vehicle stability control method according to the present invention.

Referring to FIG. 1, the preferred embodiment of a vehicle stability control system according to the present invention is adapted to be operatively associated with a motor vehicle 1, which has an active front-wheel steering (AFS) system in the present embodiment, and may have such as a steer-by-wire (SBW) system or a four-wheel steering (4WS) system in other embodiments. The vehicle stability control system is configured to perform steps of the preferred embodiment of a vehicle stability control method according to the present invention as shown in FIG. 2.

The motor vehicle 1 has a front axle shaft 11 operatively coupled to a vehicle drive unit 16 (e.g., a powertrain unit), a pair of front road wheels 13 rotatably and respectively coupled to opposite ends of the front axle shaft 11, and a steering wheel 15 operatively associated with the front road wheels 13 through the AFS system of the motor vehicle 1.

The vehicle stability control system includes a detecting module 2, a database 3, a processing module 4, and a control module 5.

In step a), the detecting module 2 is configured to detect an actual yaw rate of the motor vehicle 1, and to obtain a plurality of detection values by detecting a vehicle speed, a steering wheel angle, a lateral acceleration status, a load status, and a steering wheel angular speed status of the motor vehicle 1. Since a skilled artisan may readily appreciate implementation of the aforesaid detections through use of such as yaw rate sensors, acceleration sensors, and gyroscopes, detailed descriptions of the same will not be given hereinafter for the sake of brevity. In particular, the load status is a load status of a suspension unit of the motor vehicle 1 in a direction perpendicular to the plane on which the motor vehicle 1 is travelling, and hence is related to a load status of the front axle shaft 11 and that of the front road wheels 13.

Figure 3:
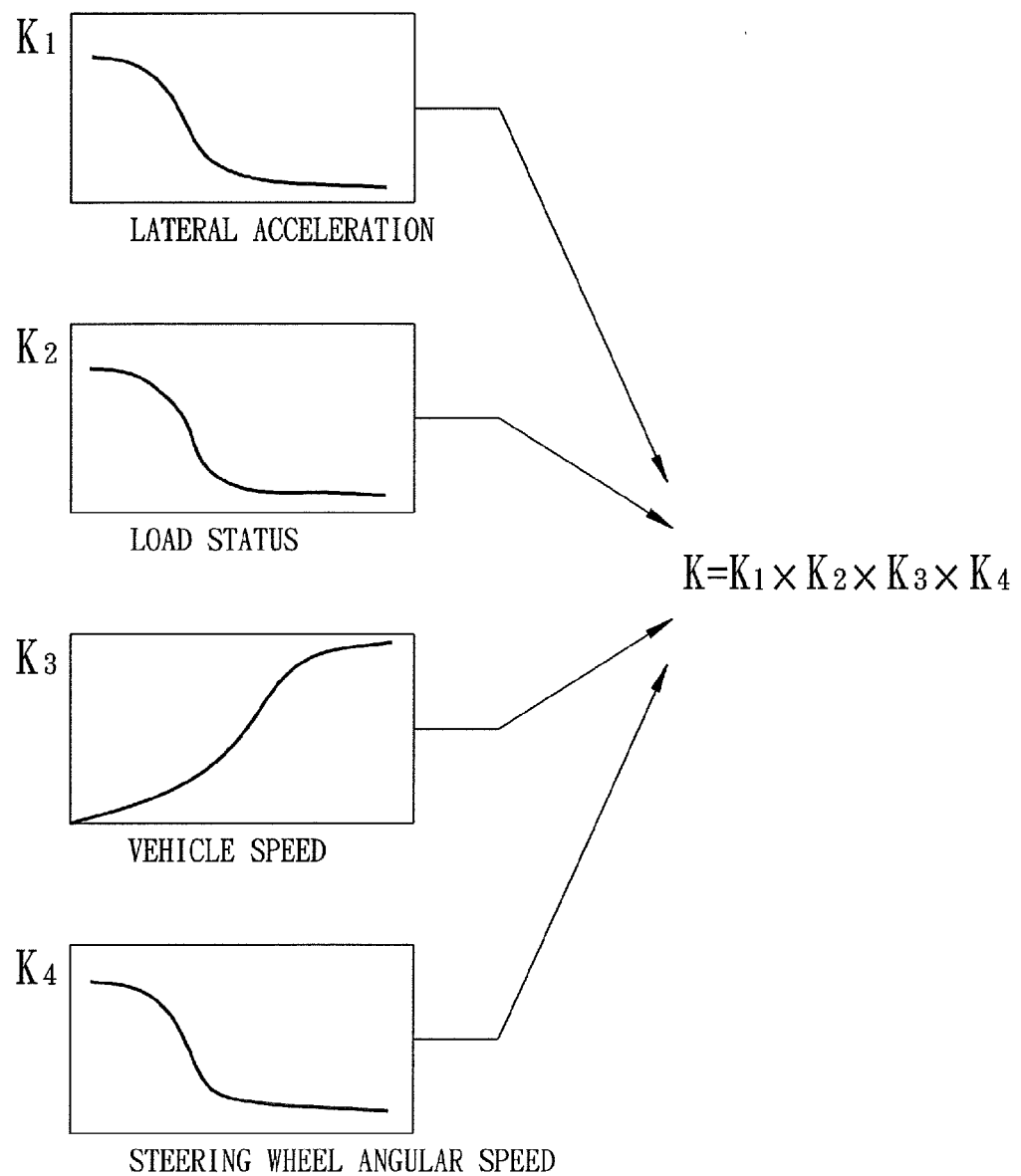
FIG. 3 is a diagram to illustrate relationships between detection values and weight values, respectively.

In step b), the processing module 4, which is operatively associated with the detecting module 2 and the database 3, is configured to obtain a plurality of intermediate weight values based on the detection values obtained by the detecting module 2 with reference to predefined weight relationships stored in the database 3. Referring to FIG. 3, in this embodiment, the intermediate weight values include: a first weight value (K1) corresponding and having a predefined negative relation to the lateral acceleration status; a second weight value (K2) corresponding and having a predefined negative relation to the load status; a third weight value (K3) corresponding and having a predefined positive relation to the vehicle speed; and a fourth weight value (K4) corresponding and having a predefined negative relation to the steering wheel angular speed status. In the same step, the processing module 2 is further configured to determine a steering characteristic value (K) from the intermediate weight values based on a product of the intermediate weight values. In other embodiments, determination of the steering characteristic value (K) with reference to the intermediate weight values may be otherwise.

In step c), the processing module 2 is further configured to obtain a target yaw rate ($\gamma_{target}$) based on $$\frac{\gamma_{target}}{\delta} = \frac{\frac{V}{L}}{1 + \frac{KV^2}{57.3L}}$$

where $\delta$ is the steering wheel angle, V is the vehicle speed, L is a wheelbase of the motor vehicle 1, and K is the steering characteristic value.

In step d), the control module 5, which is operatively associated with the processing module 4 and the AFS system, is configured to determine that steering intervention is needed and to proceed to step e) if a difference between the target yaw rate ($\gamma_{target}$) and the actual yaw rate is greater than a first predetermined threshold value, and to determine that steering intervention is not needed and to proceed back to step a) if otherwise.

In step e), the processing module 4 is configured to obtain a maximum tolerable yaw rate ($\gamma_{max}$) based on $$\frac{\gamma_{max}}{\delta} = \frac{\frac{V}{L}}{1 + \frac{V^2}{57.3L}}$$

In step f), the control module 5 is configured to control steering of the front road wheels 13 according to the target yaw rate ($\gamma_{target}$) if the target yaw rate ($\gamma_{target}$) is not greater than the maximum tolerable yaw rate ($\gamma_{max}$), and according to the maximum tolerable yaw rate ($\gamma_{max}$) if the target yaw rate ($\gamma_{target}$) is greater than the maximum tolerable yaw rate ($\gamma_{max}$).

In step g), the control module 5 is configured to determine whether the first detection value (corresponding to the lateral acceleration status) is greater than a second predetermined threshold value, to proceed to step h) if affirmative, and to proceed back to step a) if otherwise.

In step h), the control module 5 is configured to control at least one of a braking system and the powertrain system of the motor vehicle 1 to reduce lateral acceleration. Since a skilled artisan may readily appreciate implementation of such methods of assistive intervention, description of the same will hence be omitted hereinafter for the sake of brevity.

In summary, through introducing correction factors (i.e., the steering wheel angle, the steering wheel angular speed status, the load status, the vehicle speed, and the lateral acceleration status) into calculations of the target yaw rate ($\gamma_{target}$) and the maximum tolerable yaw rate ($\gamma_{max}$), the vehicle stability control method and system of the present invention are characterized by a relatively high accuracy and are applicable to different types of motor vehicles. In addition, lateral acceleration of the motor vehicle 1 may be controlled through braking intervention and motor output adjustment to assist stabilizing the motor vehicle 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A vehicle stability control method to be performed by a vehicle stability control system of a motor vehicle, said vehicle stability control method comprising the steps of:
   a) detecting an actual yaw rate of the motor vehicle, and obtaining a plurality of detection values by detecting a vehicle speed of the motor vehicle, a steering wheel angle of the motor vehicle, and at least one operation status selected from a lateral acceleration status, a load status and a steering wheel angular speed status of the motor vehicle;
   b) obtaining a plurality of intermediate weight values, from which a steering characteristic value is determined, based on the detection values obtained in step a);
   c) obtaining a target yaw rate based on the vehicle speed, the steering wheel angle and the steering characteristic value; and
   d) controlling steering of road wheels of the motor vehicle according to difference between the target yaw rate obtained in step c) and the actual yaw rate detected in step a);
   wherein the intermediate weight values include a first weight value corresponding to the lateral acceleration status a second weight value corresponding to the load status, a third weight value corresponding to the vehicle speed, and a fourth weight value corresponding to the steering wheel angular speed status; and
   wherein the first weight value has a predefined negative relation to the lateral acceleration status, the second weight value has a predefined negative relation to the load status, the third weight value has a predefined positive relation to the vehicle speed, and the fourth weight value has a predefined negative relation to the steering wheel angular speed.

2. The vehicle stability control method as claimed in claim 1, wherein the load status is a load status of a suspension unit of the motor vehicle.

3. The vehicle stability control method as claimed in claim 1, wherein the steering characteristic value is a product of the intermediate weight values, and the target yaw rate is obtained based on $$\frac{\gamma_{target}}{\delta} = \frac{\frac{V}{L}}{1 + \frac{KV^2}{57.3L}}$$

where $\gamma_{target}$ is the target yaw rate, $\delta$ is the steering wheel angle, V is the vehicle speed, L is a wheelbase of the motor vehicle, and K is the steering characteristic value.

4. The vehicle stability control method as claimed in claim 1, wherein the steering characteristic value is a function of the intermediate weight values, and the target yaw rate is obtained based on $$\frac{\gamma_{target}}{\delta} = \frac{\frac{V}{L}}{1 + \frac{KV^2}{57.3L}}$$

where $\gamma_{target}$ is the target yaw rate, $\delta$ is the steering wheel angle, V is the vehicle speed, L is a wheelbase of the motor vehicle, and K is the steering characteristic value.

5. The vehicle stability control method as claimed in claim 1, wherein step d) further includes controlling at least one of a braking system and a powertrain system of the motor vehicle when the detection value corresponding to the lateral acceleration status of the motor vehicle is greater than a predetermined threshold value.

6. A vehicle stability control method to be performed by a vehicle stability control system of a motor vehicle, said vehicle stability control method comprising the steps of:
   a) obtaining a plurality of detection values by detecting a vehicle speed of the motor vehicle, a steering wheel angle of the motor vehicle, and at least one operation status selected from a lateral acceleration status, a load status and a steering wheel angular speed status of the motor vehicle;
   b) obtaining a plurality of intermediate weight values, from which a steering characteristic value is determined, based on the detection values obtained in step a);
   c) obtaining a target yaw rate and a maximum tolerable yaw rate based on the vehicle speed, the steering wheel angle and the steering characteristic value; and
   d) controlling steering of road wheels of the motor vehicle according to the target yaw rate if the target yaw rate is not greater than the maximum tolerable yaw rate and according to the maximum tolerable yaw rate if the target yaw rate is greater than the maximum tolerable yaw rate;
   wherein the intermediate weight values include a first weight value corresponding to the lateral acceleration status, a second weight value corresponding to the load status, a third weight value corresponding to the vehicle speed, and a fourth weight value corresponding to the steering wheel angular speed status; and
   wherein the steering characteristic value is a product of the intermediate weight values, and the target yaw rate and the maximum tolerable yaw rate are obtained based on $$\frac{\gamma_{target}}{\delta} = \frac{\frac{V}{L}}{1 + \frac{KV^2}{57.3L}} \text{ and}$$

$$\frac{\gamma_{max}}{\delta} = \frac{\frac{V}{L}}{1 + \frac{V^2}{57.3L}}$$

where $\gamma_{target}$ is the target yaw rate, $\gamma_{max}$ is the maximum tolerable yaw rate, $\delta$ is the steering wheel angle, V is the vehicle speed, L is a wheelbase of the motor vehicle, and K is the steering characteristic value.

7. A vehicle stability control system for a motor vehicle, comprising:
a detecting module configured to detect an actual yaw rate of the motor vehicle, and to obtain a plurality of detection values by detecting a vehicle speed of the motor vehicle, a steering wheel angle of the motor vehicle, and at least one operation status selected from a lateral acceleration status, a load status and a steering wheel angular speed status of the motor vehicle;
a processing module operatively associated with said detecting module, and configured to obtain a plurality of intermediate weight values, from which a steering characteristic value is determined, based on the detection values obtained by said detecting module, and to obtain a target yaw rate based on the vehicle speed, the steering wheel angle and the steering characteristic value; and
a control module operatively associated with said processing module, and configured to control steering of road wheels of the motor vehicle according to difference between the target yaw rate obtained by said processing module and the actual yaw rate detected by said detecting module;
wherein the intermediate weight values include a first weight value corresponding to the lateral acceleration status, a second weight value corresponding to the load status, a third weight value corresponding to the vehicle speed, and a fourth weight value corresponding to the steering wheel angular speed status; and
wherein the first weight value has a predefined negative relation to the lateral acceleration status, the second weight value has a predefined negative relation to the load status, the third weight value has a predefined positive relation to the vehicle speed, and the fourth weight value has a predefined negative relation to the steering wheel angular speed.

8. The vehicle stability control system as claimed in claim 7, wherein the load status is a load status of a suspension unit of the motor vehicle.

9. The vehicle stability control system as claimed in claim 7, wherein the steering characteristic value is a product of the intermediate weight values, and the target yaw rate is obtained based on $$\frac{\gamma_{target}}{\delta} = \frac{\frac{V}{L}}{1 + \frac{KV^2}{57.3L}}$$

where $\gamma_{target}$ is the target yaw rate, $\delta$ is the steering wheel angle, V is the vehicle speed, L is a wheelbase of the motor vehicle, and K is the steering characteristic value.

10. The vehicle stability control system as claimed in claim 7, wherein the steering characteristic value is a function of the intermediate weight values, and the target yaw rate is obtained based on $$\frac{\gamma_{target}}{\delta} = \frac{\frac{V}{L}}{1 + \frac{KV^2}{57.3L}}$$

where $\gamma_{target}$ is the target yaw rate, $\delta$ is the steering wheel angle, V is the vehicle speed, L is a wheelbase of the motor vehicle, and K is the steering characteristic value.

11. The vehicle stability control system as claimed in claim 7, wherein said control module is further configured to control at least one of a braking system and a powertrain system of the motor vehicle when the detection value corresponding to the lateral acceleration status of the motor vehicle is greater than a predetermined threshold value.

12. A vehicle stability control system for a motor vehicle, comprising:
a detecting module configured to obtain a plurality of detection values by detecting a vehicle speed of the motor vehicle, a steering wheel angle of the motor vehicle, and at least one operation status selected from a lateral acceleration status, a load status and a steering wheel angular speed status of the motor vehicle;
a processing module operatively associated with said detecting module, and configured to obtain a plurality of intermediate weight values, from which a steering characteristic value is determined, based on the detection values obtained by said detecting module, and to obtain a target yaw rate and a maximum tolerable yaw rate based on the vehicle speed, the steering wheel angle and the steering characteristic value; and
a control module operatively associated with said processing module, and configured to control steering of road wheels of the motor vehicle according to the target yaw rate if the target yaw rate is not greater than the maximum tolerable yaw rate and according to the maximum tolerable yaw rate if the target yaw rate is greater than the maximum tolerable yaw rate;
wherein the intermediate weight values include a first weight value corresponding to the lateral acceleration status, a second weight value corresponding to the load status, a third weight value corresponding to the vehicle speed, and a fourth weight value corresponding to the steering wheel angular speed status; and
wherein the steering characteristic value is a product of the intermediate weight values, and the target yaw rate and the maximum tolerable yaw rate are obtained based on $$\frac{\gamma_{target}}{\delta} = \frac{\frac{V}{L}}{1 + \frac{KV^2}{57.3L}} \text{ and}$$

$$\frac{\gamma_{max}}{\delta} = \frac{\frac{V}{L}}{1 + \frac{V^2}{57.3L}}$$

where $\gamma_{target}$ is the target yaw rate, $\gamma_{max}$ is the maximum tolerable yaw rate, $\delta$ is the steering wheel angle, V is the vehicle speed, L is a wheelbase of the motor vehicle, and K is the steering characteristic value.

* * * * *